(12) United States Patent
Ramirez Pavon et al.

(10) Patent No.: US 11,430,338 B2
(45) Date of Patent: Aug. 30, 2022

(54) INTERSECTION CROSSING CONTROL

(71) Applicant: Ford Global Technologies, LLC, Dearborn, MI (US)

(72) Inventors: Omar Antonio Ramirez Pavon, Edo. Mex (MX); Carlos Alberto Caballero De Ita, Bentio Juarez (MX); Edgar Javier Ortega Garcia, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 16/634,607

(22) PCT Filed: Aug. 3, 2017

(86) PCT No.: PCT/US2017/045245
§ 371 (c)(1),
(2) Date: Jan. 28, 2020

(87) PCT Pub. No.: WO2019/027460
PCT Pub. Date: Feb. 7, 2019

(65) Prior Publication Data
US 2020/0234598 A1    Jul. 23, 2020

(51) Int. Cl.
*G05D 1/00* (2006.01)
*G08G 1/00* (2006.01)
*G05D 1/02* (2020.01)

(52) U.S. Cl.
CPC ............. *G08G 1/22* (2013.01); *G05D 1/0297* (2013.01); *G08G 1/20* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 4,864,306 A | * | 9/1989 | Wiita | B61L 25/023 340/991 |
| 5,396,426 A | * | 3/1995 | Hibino | B60K 31/0008 123/352 |
| 5,777,451 A | | 7/1998 | Kobayashi et al. | |
| 6,032,097 A | | 2/2000 | Iihoshi et al. | |
| 7,382,274 B1 | | 6/2008 | Kermani et al. | |
| 7,747,041 B2 | | 6/2010 | Saito et al. | |
| 8,482,431 B2 | * | 7/2013 | Kushi | G08G 1/161 340/901 |

(Continued)

FOREIGN PATENT DOCUMENTS

DE    102014216269 A1    2/2016
WO    2016065055 A1    4/2016

OTHER PUBLICATIONS

International Search Report of the International Searching Authority for PCT/US2017/045245 dated Oct. 12, 2017.

*Primary Examiner* — James M McPherson
(74) *Attorney, Agent, or Firm* — Brandon Hicks; Bejin Bieneman PLC (57) ABSTRACT

A system and/or method includes comprising designating, from a plurality of vehicles at an intersection, a first vehicle as a lead vehicle, actuating a second vehicle to follow the lead vehicle, and after determining that the lead vehicle has entered the intersection, designating the second vehicle as the lead vehicle.

17 Claims, 4 Drawing Sheets

(56) References Cited

U.S. PATENT DOCUMENTS

| | | |
|---|---|---|
| 8,655,575 B2 | 2/2014 | Reghunath |
| 8,718,906 B2 * | 5/2014 | Miller .............. G08G 1/096716 |
| | | 701/119 |
| 8,855,860 B2 | 10/2014 | Isaji et al. |
| 8,977,420 B2 | 3/2015 | Deng et al. |
| 9,020,660 B2 * | 4/2015 | Mudalige ............... G05D 13/00 |
| | | 701/2 |
| 9,147,348 B2 | 9/2015 | Emam et al. |
| 9,218,739 B2 | 12/2015 | Trombley et al. |
| 9,412,271 B2 | 8/2016 | Sharma |
| 9,633,560 B1 | 4/2017 | Gao et al. |
| 10,067,897 B1 * | 9/2018 | Lesher ................. G01S 7/4972 |
| 2002/0145541 A1 * | 10/2002 | Matsui ................. G08G 1/0104 |
| | | 340/936 |
| 2004/0189493 A1 * | 9/2004 | Estus ...................... G08G 1/20 |
| | | 340/988 |
| 2010/0303544 A1 | 12/2010 | Xuan |
| 2011/0298603 A1 * | 12/2011 | King ..................... G08G 1/042 |
| | | 340/436 |
| 2013/0060456 A1 | 3/2013 | Pourparhizkar |
| 2013/0335238 A1 | 12/2013 | Matsur |
| 2017/0039850 A1 * | 2/2017 | Vanden Berg ........... B60Q 9/00 |
| 2019/0324459 A1 * | 10/2019 | Baalke .............. B60W 30/0956 |

* cited by examiner

INTERSECTION CROSSING CONTROL

BACKGROUND

Vehicles may stop in a line or queue, i.e., one after each other, at an intersection, e.g., because of a red traffic light. After the traffic light switches to green, each vehicle in the queue should wait for the vehicle in front of it to get underway before itself moving, except that a first vehicle, i.e., a vehicle in front of the queue with no other vehicles in front of it can begin moving without concern about other vehicles to its front. Vehicles that are not the lead vehicle, however, must maintain a safe distance from a forward vehicle; it is a problem that, in so doing, following vehicle can operate inefficiently, not proceeding through intersections as quickly as possible, consuming additional fuel and wear on brakes, and moreover causing inefficiencies in traffic flow.

DETAILED DESCRIPTION

Introduction

Disclosed herein is a method including designating, from a plurality of vehicles at an intersection, a first vehicle as a lead vehicle, actuating a second vehicle to follow the lead vehicle, and after determining that the lead vehicle has entered the intersection, designating the second vehicle as the lead vehicle.

The method may further include actuating a third vehicle to follow the second vehicle after the second vehicle has been designated as the lead vehicle.

The second vehicle may be between the first vehicle and the third vehicle.

The second vehicle may be immediately behind the first vehicle in a travel direction.

The method may further include identifying the plurality of vehicles while the vehicles stopped at the intersection.

The method may further include instructing the second vehicle to accelerate based on an acceleration of the lead vehicle.

The method may further include receiving a wireless signal from each of the plurality of vehicles, and identifying the plurality of vehicles at the intersection based on received wireless signals.

The method may further include receiving a wireless signal, at a transceiver mounted above each of lanes at the intersection with a directional antenna directed toward the respective lane, and determining an order of the vehicles at the respective lane based on the received wireless signal.

The method may further include determining respective distances of each of the vehicles to the intersection based on a time between transmitting a wireless signal from a transceiver at the intersection and receiving, in response to the transmitted signal, the wireless signal from the respective vehicle.

The method may further include determining a first distance between the intersection and a front transceiver of each of the plurality of vehicles, determining a second distance between the intersection and a rear transceiver of each respective vehicle, and determining a travel direction of the respective vehicle based on the determined first and second distances.

Further disclosed herein is a system including a computer that is programmed to designating, from a plurality of vehicles at an intersection, a first vehicle as a lead vehicle, actuating a second vehicle to follow the lead vehicle, and after determining that the lead vehicle has entered the intersection, designating the second vehicle as the lead vehicle.

The computer may be further programmed to actuate a third vehicle to follow the second vehicle after the second vehicle has been designated as the lead vehicle.

The computer may be further programmed to identify the plurality of vehicles while the vehicles stopped at the intersection.

The computer may be further programmed to receive an acceleration of the lead vehicle and instruct the second vehicle to accelerate based on the received acceleration of the lead vehicle.

The computer may be further programmed to receive a wireless signal from each of the plurality of vehicles, and identifying the plurality of vehicles at the intersection based on received wireless signals.

The computer may be further programmed to determine a travel direction of each of the vehicles by receiving a first wireless signal from a front transceiver mounted to a front of each of the vehicles and a second wireless signal from a rear transceiver mounted to a rear of each of the vehicles.

The system may further include a first and a second antenna mounted at the intersection directed respectively to a first and a second lane, wherein the computer is further programmed to designate a first lead vehicle for the first lane and a second lead vehicle for the second lane based on wireless signals received via the first and the second antennas.

The computer may be further programmed to determine an order of the vehicles at each of the first and the second lanes based on the received wireless signals.

The computer may be further programmed to determine respective distances of each of the vehicles to the intersection based on a time between transmitting a wireless signal from a transceiver at the intersection and receiving, in response to the transmitted signal, the wireless signal from the respective vehicle.

The computer may be further programmed to determine a first distance between the intersection and a front transceiver of each of the plurality of vehicles, determine a second distance between the intersection and a rear transceiver of each respective vehicle, and determine a travel direction of the respective vehicle based on the determined first and second distances.

Further disclosed is a computing device programmed to execute the any of the above method steps.

Yet further disclosed is a computer program product, comprising a computer readable medium storing instructions executable by a computer processor, to execute any of the above method steps.

Exemplary System Elements

Figure 1:
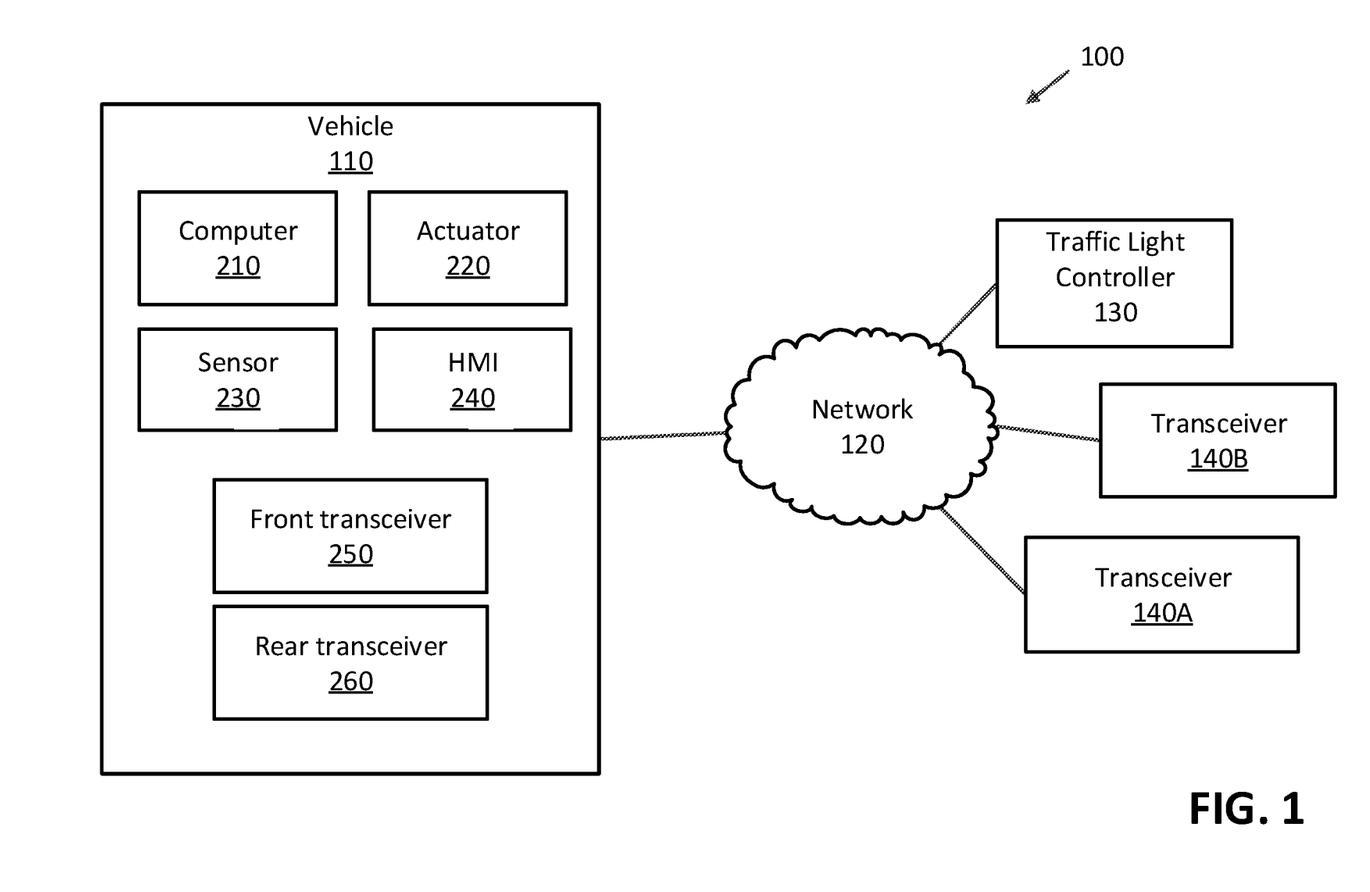
FIG. 1 is a block diagram of an exemplary system for controlling of motion in vehicles arranged in a line.
Figure 2:
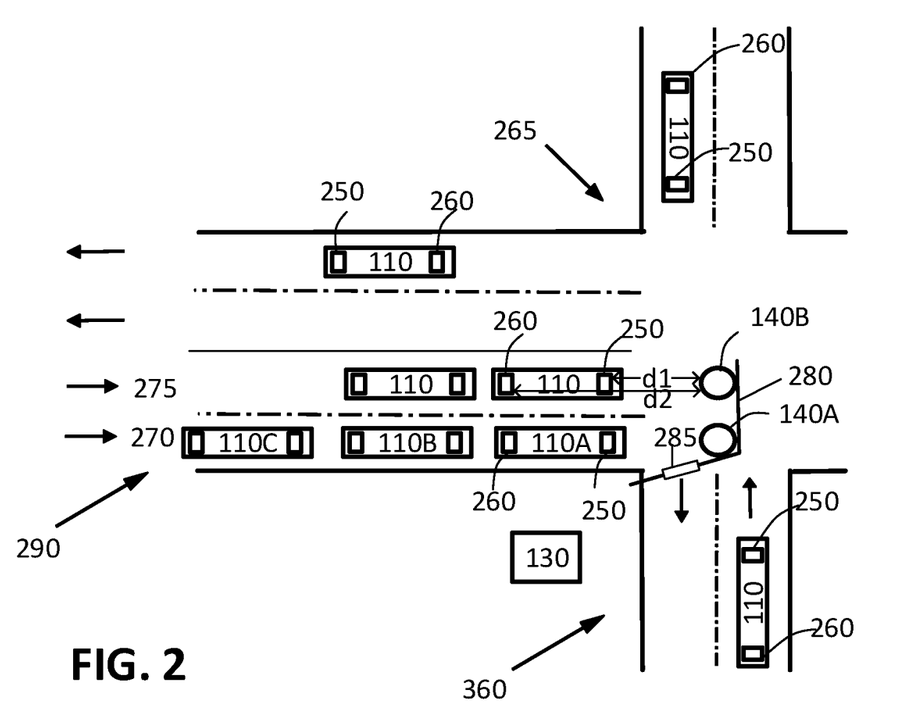
FIG. 2 is a diagram showing vehicles and a traffic light in the context of the system of FIG. 1.

With reference to FIGS. 1-2, a system 100 includes vehicles 110, a wireless communication network 120, a traffic light controller 130, and transceiver(s) 140A, 140B.

The traffic light controller 130 is typically a computer with a processor and a memory such as are known. The memory includes one or more forms of computer-readable media, and stores instructions executable by the processor for performing various operations, including as disclosed herein. The processor of the traffic light controller 130 may include programming to receive data from the transceivers 140A, 140B via the network 120, e.g., a wired or a wireless network interface.

The traffic light controller 130 may include programming to change the light at specified times or time intervals, e.g., to control a green-yellow-red cycle. Further, the controller 130 can include a wired or wireless communication mechanism such is known to communicate via a network 120 with respective computers 210 in the vehicles 110 and/or other remote computers, e.g., that may provide instructions to control operation, e.g., timing, of the traffic light by the traffic light controller 130.

Figure 3:
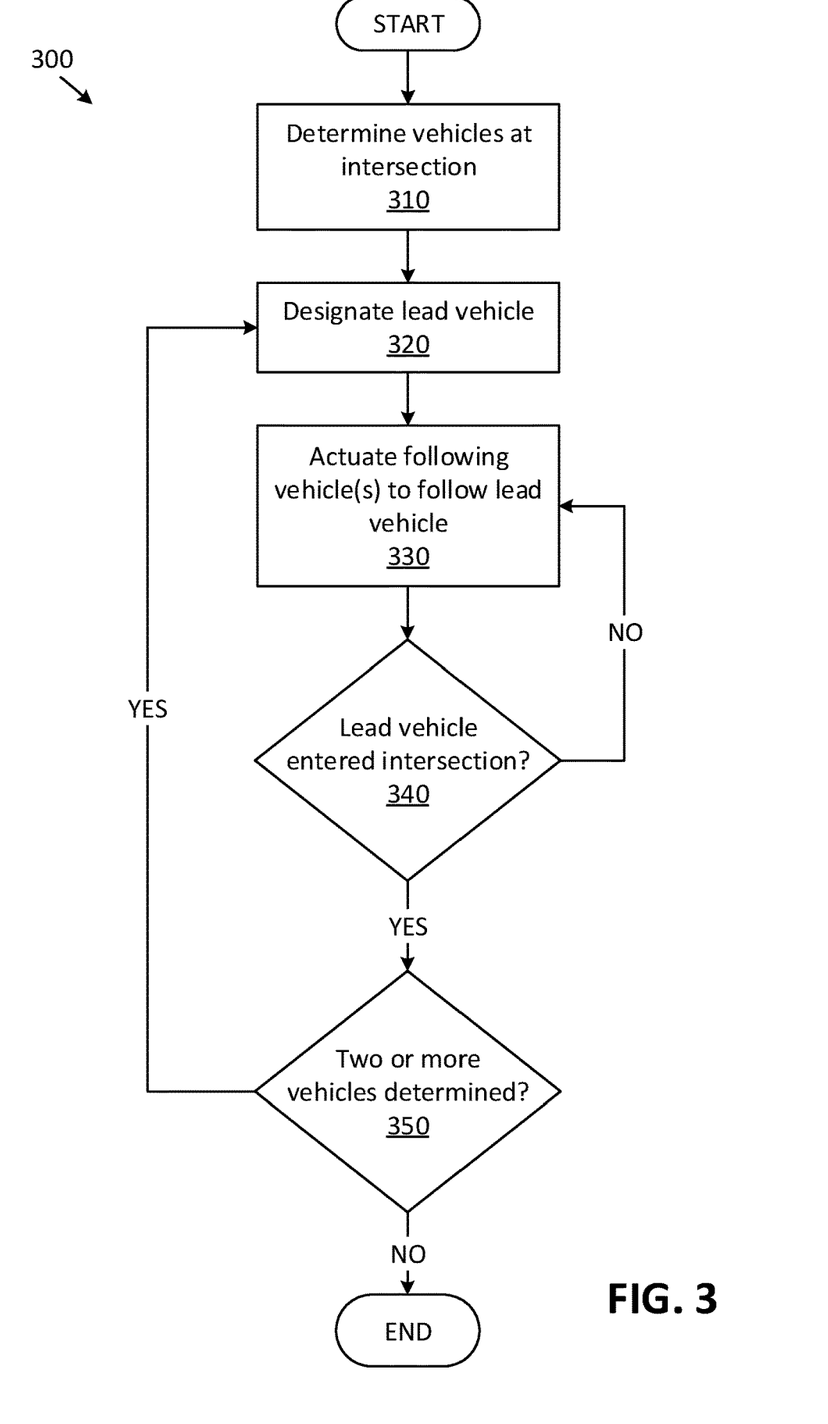
FIG. 3 is a flowchart of an exemplary process for controlling vehicles at an intersection.

The traffic light controller 130 may be programmed to communicate with vehicle 110 transceivers 250, 260, and to determine a distance between the transceivers 140A, 140B to other transceivers mounted to the vehicles 110 (see FIG. 2-3). The transceivers 140A, 140B may be mounted to a traffic light pole 280 at an intersection 265. In one example, the controller 130 may be programmed to determine the distance between the transceivers 140A, 140B and vehicle 110 transceivers 250, 260 based on known time-of-travel techniques, as discussed below.

FIG. 1 is a block diagram of a vehicle 110. The vehicle 110 may be powered in variety of known ways, e.g., with an electric motor and/or internal combustion engine. The vehicle 110 may include a computer 210, actuator(s) 220, sensor(s) 230, a human machine interface (HMI) 240, and wireless signal transceiver(s) 250, 260, each of which are discussed in more detail below.

The computer 210 includes a processor and a memory such as are known. The memory includes one or more forms of computer-readable media, and stores instructions executable by the computer 210 for performing various operations, including as disclosed herein.

The computer 210 may operate the vehicle 110 in an autonomous, semi-autonomous, and/or non-autonomous mode. For purposes of this disclosure, an autonomous mode is defined as one in which each of vehicle 110 propulsion (e.g., via a powertrain including an electric motor and/or an internal combustion engine), braking, and steering are controlled by the computer 210; in a semi-autonomous mode, the computer 210 controls one or two of vehicle 110 propulsion, braking, and steering; in a non-autonomous mode, a vehicle 110 user controls propulsion, braking, and steering of the vehicle 110.

The computer 210 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 210, as opposed to a human operator, is to control such operations.

The computer 210 is generally arranged for communications on a vehicle communication network, e.g., including a communication bus such as a controller area network (CAN) or the like. The computer 210 may include or be communicatively coupled to, e.g., via a vehicle communications bus as described further below, more than one processor, e.g., controllers or the like included in the vehicle for monitoring and/or controlling various subsystems such as a powertrain, brake, steering, etc.

Via the vehicle network, the computer 210 may transmit messages to various devices in the vehicle 110 and/or receive messages from the various devices, e.g., controllers, actuators, sensors, etc., including sensors 230. Alternatively or additionally, in cases where the computer 210 actually comprises multiple devices, the vehicle communication network may be used for communications between devices represented as the computer 210 in this disclosure. Further, as mentioned below, various controllers and/or sensors 230 may provide data to the computer 210 via the vehicle communication network.

In addition, the computer 210 may be configured for communicating through a wireless communication interface, e.g., the transceivers 250, 260, with a remote computer such as the controller 130. The wireless communication interface may communicate via a communication network 120. The communication network 120 may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular such as Long-Term Evolution (LTE), Bluetooth™ IEEE 802.11, dedicated short range communications (DSRC), and/or wide area networks (WAN), including the Internet, providing data communication services.

Sensors 230 may include a variety of devices known to provide data via the vehicle communications bus. For example, the sensors 230 may include one or more cameras, radars, and/or Light Detection and Ranging (LIDAR) sensors disposed in the vehicle 110 providing data encompassing at least some of the vehicle exterior. The data may be received by the computer 210 through a suitable communications mechanism, e.g., a vehicle network, e.g., a controller area network (CAN) bus or the like, or other network.

The actuators 220 typically include circuits, chips, or other electronic components that can actuate various vehicle subsystems in accordance with appropriate control signals as is known. For instance, the actuators 220 may include one or more relays, servomotors, etc. The actuators 220, therefore, may be used to control braking, acceleration, and steering of the vehicle 110. The control signals used to control the actuators 220 may be generated by the computer 210, a control unit located in the vehicle 110, e.g., the brake controller, etc.

The HMI 140 may be configured to receive user input, e.g., during operation of the vehicle 110. As one example, an HMI 140 may include touchscreens, buttons, knobs, keypads, microphone, and so on for receiving information from a user. Moreover, an HMI 140 may include various interfaces such a Ford SYNC® computing interface, a smart phone, etc., for receiving information from a user and/or output information to the user.

The vehicle 110 transceivers 250, 260, and/or the transceivers 140A, 140B may include known electronic circuitry such as a wireless (or radio frequency) signal transmitter, a wireless (or radio frequency) signal receiver, and an amplifier circuit to boost an outgoing and incoming radio frequency signal. The vehicle 110 computer 210 may be programmed to receive a wireless signal, via the wireless signal receiver. The wireless signal transceivers 140A, 140B, 250, 260 may be configured to send and/or receive wireless signals based on various wireless communication protocols, e.g., LTE, Bluetooth™, WAN, etc.

The computer 210 may be programmed to receive, via the wireless communication network 120 such as LTE, an instruction from a remote computer such as the controller 130 and control vehicle 110 operation based on the received instruction. The received instruction may include an instruction to accelerate. Thus, the computer 210 may be programmed to accelerate the vehicle 110 based on the received instruction. The received instruction may include a following distance instruction, e.g., 5 meters, a specific rate of acceleration, a time at which a specific speed should be achieved, etc. For example, the computer 210 may be programmed to actuate the vehicle 110 operation, e.g., propulsion and/or braking, to maintain the following distance to a next vehicle 110 based on the received following distance.

FIG. 2-3 shows an example road intersection 265. "Intersection" as the term is generally understood with respect to roadways, and in the context of present disclosure, refers to a crossing of two or more roads such as roads 290, 360. One or more traffic light poles 280 may be installed at the intersection 265, e.g., to provide guidance (e.g., whether vehicles 110 are permitted or not permitted to move through the intersection 265) to vehicles 110 via traffic lights 285 mounted to the pole 280. As discussed above, the controller 130 may be programmed to control a red-yellow-green cycle of the light 285. Additionally or alternatively, the traffic lights 285 may be installed in various fashions, e.g., mounted to an overhead gantry with a beam mounted parallel to a ground surface.

Roads at an intersection may be one way or bidirectional, and/or single lane or multilane. For example, as shown in FIG. 2-3, a multilane bidirectional road 290 crosses a single lane bidirectional road 360 at the intersection 265. The lanes 270, 275 are in a travel direction toward the intersection 265. The lanes of the road 290 in an opposite direction of the lanes 270, 275 are not numbered.

The controller 130 may be programmed to determine a distance between the transceivers 140A, 140B and the vehicle 110 transceivers 250, 260 such as distances $d_1$, $d_2$ between 140A and the vehicle 110 transceivers 250, 260. In one example, the controller 130 broadcasts a wireless signal from the transceiver 140A and determines the distance $d_1$, $d_2$ to the vehicles 110 based on received wireless responses from the vehicles 110 based on signal transmission time, i.e., a time from broadcasting until receiving a response from a respective vehicle 110 transceiver 250, 260. The controller 130 may be programmed to determine a respective distance of each of the vehicles 110 to the intersection 265 based on a time between transmitting a wireless signal from the transceiver at the intersection 265 and receiving, in response to the transmitted signal, the wireless signal from the respective vehicle 110. The received wireless signal may include an identifier of the respective vehicle 110. That is, the controller 130 may be further programmed to associate a distance $d_1$ to the identifier of the respective vehicle 110.

In one example shown in FIGS. 2-3, the front transceiver 250 is mounted to a front of the vehicle 110 and the rear transceiver 260 is mounted to a rear of the vehicle 110. The transceivers 140A, 140B may be mounted to the traffic light pole 280. The transceivers 140A, 140B may be associated with the lanes 270, 275, e.g., in a direction of the respective lanes 270, 275. The transceivers 140A, 140B may each include a directional antenna that broadcasts the wireless signal over an associated lane, e.g., the transceivers 140A, 140B may broadcast respectively to the lanes 270, 275. A directional antenna as the term is generally understood and in the present context refers to an antenna with a main lobe of antenna's radiation pattern being directed to a given direction, e.g., along the lane 270. Thus, the vehicles 110 in an adjacent lane, e.g., the lane 275, may receive a weak signal or may not receive a signal from the antenna directed to the lane 270.

The vehicles 110 driving on the lanes 270, 275 may stop at the intersection 265, e.g., upon activation of red light 285. For example, the first vehicle 110A stops at the red light 285. Other vehicles 110, e.g., a second and a third vehicle 110B, 110C, may stop and wait behind the first vehicle 110A. After the light 285 changes to "green", all vehicles 110A, 110B, 110C may be ready to move forward but the second vehicle 110B may have to wait for the first vehicle 110A to move. The third vehicle 110C may wait for the first and the second vehicles 110A, 110B before moving. Especially for a vehicle 110 with multiple other vehicles 110 in front of it, starting vehicles 110 in a queue at an intersection may be a lengthy process based on a number of vehicles 110 in the lane 270, reaction time of each vehicle 110 after a vehicle 110 in front of it moves, acceleration of each of the vehicles 110, etc. Advantageously, the controller 130 can be programmed to designate, from the vehicles 110 at the intersection 265, the first vehicle 110A as a lead vehicle 110, and actuate the second vehicle 110B to follow the lead vehicle 110. The controller 130 can be further programmed to designate the second vehicle 110B as the lead vehicle 110 after determining that the lead vehicle 110 has entered the intersection 265.

"A vehicle 110 entering an intersection 265", in the present context may mean the vehicle 110 passes a geometrical center of the intersection 265, e.g., where longitudinal axes of roads cross. Additionally or alternatively, "entering the intersection 265" may mean passing the traffic light 285 associated with the vehicle lane, such as the lane 270 for the vehicle 110A and/or passing a line drawn at the intersection 265 on a road 290 surface where the vehicles 110 are supposed to stop when the light 285 is red. The controller 130 may be programmed to determine that the lead vehicle 110 entered the intersection 265 upon determining that distance $d_1$ to the vehicle 110 front transceiver 250 is greater than the distance $d_2$ to the vehicle 110 rear transceiver 260.

To "designate" a vehicle 110 in the present context means to select the vehicle 110 as a lead vehicle 110 or as a following vehicle 110. The controller 130 may be programmed to designate a vehicle 110 as, e.g., the lead vehicle 110, by storing an assignment of the identifier of the respective vehicle 110 as the lead vehicle 110 in a controller 130 memory. Upon changing a designation, e.g., selecting the second vehicle 110B as the lead vehicle 110, the controller 130 may update the information in the controller 130 memory, e.g., storing an assignment of the identifier of the second vehicle 110B as the lead vehicle 110, in the controller 130 memory.

The second vehicle 110B may be immediately behind the first vehicle 110A in a travel direction, i.e., no other vehicle 110, motorcycle, etc. may be between them. "Travel direction" in the present context refers to a direction of vehicle 110 movement relative to the intersection 265, e.g., a travel direction may be "approaching" or "departing from" the intersection 265.

The controller 130 may be programmed to identify the vehicles 110 at the intersection 265, e.g., by receiving a wireless signal from each of the vehicles 110, and identifying the vehicles 110 at the intersection 265 based on the received wireless signals. In one example, the computer 210 may be programmed to identify the vehicles 110 while the vehicles 110 are stopped at the intersection 265. Additionally, the controller 130 may be programmed to identify stopped vehicles 110 at the traffic light 285 further based on a status of the traffic light 285, e.g., while the traffic light 285 is in a "red" state. The second vehicle 110B may be between the first vehicle 110A and the third vehicle 110C, i.e., while the first, second, and third vehicles 110A, 110B, 110C are in the same lane 310, one of the vehicles, e.g., the first vehicle 110A is in front of the second vehicle 110B and one of the vehicles, e.g., the third vehicle 110C is behind the second vehicle 110B. In other words, "between" in the present context refers to vehicles 110 in a same lane.

The controller 130 may be programmed to identify a number of vehicles 110 at a lane stopped behind a traffic light 285 and/or approaching the intersection 265. In one example, the controller 130 may be programmed to identify the vehicles 110 that are within a predetermined distance, e.g., 100 meters, from the intersection 265.

The controller 130 may be programmed to determine a lead vehicle 110 only when two or more vehicles 110 are identified. In other words, the computer 210 may be programmed to designate a lead vehicle only when at least one following vehicle 110 can be determined.

To identify which vehicles 110 approach the intersection, the controller 130 may be programmed to determine a travel direction of the vehicles 110. For example, the controller 130 may be programmed to determine first distance $d_1$ between the intersection 265, e.g., the transceiver 140A at the pole 280, and a front transceiver 250 of each of the vehicles 110, e.g., mounted to a front bumper of the vehicle 110. The controller 130 may then determine the second distance $d_2$ between the intersection 265 and a rear transceiver 260 of the respective vehicle 110, and determine the travel direction of the respective vehicle 110 based on the determined first and second distances $d_1$, $d_2$.

The controller 130 may be further programmed to actuate the second vehicle 110B to accelerate based on an acceleration of the lead vehicle 110 and transmit an acceleration instruction to the second vehicle 110B based on the received acceleration of the lead vehicle 110. The controller 130 may be programmed to accelerate the second vehicle 110 with a same acceleration as of the first vehicle 110A, an acceleration slightly less (e.g., 5% less) than the acceleration of the first vehicle 110A, etc. Additionally or alternatively, the acceleration instruction may include a following distance, e.g., 5 meters, between the vehicles 110. Thus, the controller 130 may actuate the second vehicle 110B to accelerate and/or brake while maintaining a distance of 5 meters to the lead vehicle 110. In one example, the second vehicle 110B computer 210 may be programmed to maintain the following distance based on vehicle 110B radar and/or camera sensor 230 data. Additionally, the controller 130 may be programmed to actuate other vehicles 110 such as the third vehicle 110C in the lane 270 to follow the lead vehicle 110. For example, the controller 130 may be programmed to actuate multiple following vehicles 110 to follow the lead vehicle 110 while instructing the following vehicles 110 to maintain the distance, e.g., 5 meters, between one another (i.e., between two adjacent following vehicles 110 in a same lane).

As discussed above, the controller 130 may designate another vehicle 110 after determining that the lead vehicle 110 has entered the intersection. Additionally, the controller 130 may be programmed to actuate a third vehicle 110C to follow the second vehicle 110B after the second vehicle has been designated as the lead vehicle 110. In the example shown in FIG. 2-3, the second and third vehicles 110B, 110C follow the first vehicle 110A as the lead vehicle 110 until the first vehicles 110A enters the intersection 265. The controller 130 then designates the second vehicle 110B as the lead vehicle 110. That is, the third vehicle 110C then follows the second vehicle 110B which is now the lead vehicle 110.

In one example, the controller 130 may be programmed to receive a wireless signal, e.g., at the transceiver 140A mounted above the lane 270 at the intersection 265 with a directional antenna directed toward the respective lane 270. The controller 130 may be then programmed to determine an order of the vehicles 110 at the respective lane 270 based on the received wireless signal. For example, the controller 130 may determine an order such as: (i) vehicle 110A, (ii) vehicle 110B, (iii) vehicle 110C. In other words, the controller 130 may determine that the first vehicle 110A is a vehicle 110 nearest to the intersection 265. The second vehicle 110B is behind the first vehicle 110A and the third vehicle 110C is behind the second vehicle 110B. As an example, the controller 130 may be programmed to store the determined order in an array in the controller 130 memory, and cyclically update the stored data based on received wireless signal.

Processing

FIG. 3 is a flowchart of an exemplary process 300 for controlling of vehicles 110 at an intersection 265. In one example, a traffic light controller 130 can be programmed to execute blocks of the process 300.

The process 300 begins in a block 310, in which the controller 130 identifies vehicle(s) 110 at, e.g., the intersection 265. The controller 130 may be programmed to identify vehicle(s) 110 to be guided or controlled by the controller 130 in this process 300 by broadcasting wireless signal(s) via the transceiver(s) 140A, 140B, and to determine a respective distance to each of the vehicles 110 based on received wireless signals transmitted by the vehicle 110 transceivers 250, 260 in response to the broadcasted signals. The controller 130 may be programmed to identify the vehicles at the intersection 265 by determining the travel direction and/or distances of each respective vehicle 110 relative to the intersection 265. The controller 130 may be further programmed to identify only vehicles 110 that are within a predetermined distance, e.g., 100 meters, from the intersection and/or with a travel direction toward the intersection 265. Additionally or alternatively, the controller 130 may be programmed to determine an order of the vehicles 110 at the intersection 265, e.g., a sequence of the first, second, third vehicles 110A, 110B, 110C. When a road includes more than one lane, e.g., the lanes 270, 275 of the road 290, the controller 130 may be programmed to identify the vehicles 110 in each respective lane 270, 275. Thus, the controller 130 may be programmed to determine an order of the vehicles 110 for each of the lanes 270, 275, e.g., based on wireless signals received from transceivers 140A, 140B associated with each lane 270, 275.

Next, in a block 320, the controller 130 designates a lead vehicle 110, e.g., the first vehicle 110A (see FIG. 2-3). The controller 130 may be programmed to designate the lead vehicle 110 based on the determined order of the vehicles 110. Thus, the controller 130 may be programmed to designate a vehicle which is nearest to but not entered the intersection 265 as the lead vehicle 110. Additionally, the controller 130 may be further programmed to designate other vehicles 110 in a same lane as the designated following vehicles 110 (i.e., following the designated vehicle 110 in the same lane as the lane of the lead vehicle 110).

Next, in a block 330, the controller 130 provides instructions to the designated following vehicles 110 to follow the designated lead vehicle 110. For example, the controller 130 may be programmed to transmit an acceleration instruction and/or following distance to, e.g., the following second and third vehicles 110B, 110C which follow the first vehicle 110A as the lead vehicle 110. The controller 130 may be programmed to determine the acceleration and/or following distance based at least in part on data, e.g., acceleration, speed, etc., received from the lead vehicle 110.

Next, in a decision block 340, the controller determines whether the lead vehicle 110 has entered the intersection 265. For example, the controller 130 may be programmed to determine whether the lead vehicle 110 has entered the intersection 265 based on the distances $d_1$, $d_2$ to the lead vehicle 110 transceivers 250, 260. That is, the controller 130 may determine that the lead vehicle 110 has entered the intersection 265 upon determining that the distance $d_1$ is greater than the distance $d_2$. If the controller 130 determines that the lead vehicle 110 has entered the intersection 265, then the process 300 proceeds to a decision block 350; otherwise the process 300 returns to the block 330.

In the decision block 350, the controller 130 determines whether there are two or more vehicles 110 in a lane 270, 275 that have not entered the intersection 265. For example, the controller 130 may be programmed to determine the number of vehicles 110 that have not entered the intersection 265 and are within a predetermined distance threshold, e.g., 100 meters, from the intersection 265. Additionally or alternatively, the controller 130 may be programmed to determine that there is no vehicle 110 upon determining that the traffic light 285 turned to yellow or red state, although other vehicles 110 may be within the predetermined distance. If the controller 130 determines that there are two or more vehicles 110 that have not passed the intersection 265, then the process 300 returns to the block 320; otherwise the process 300 ends, or alternatively returns to the block 310, although not shown in FIG. 4.

Figure 4:
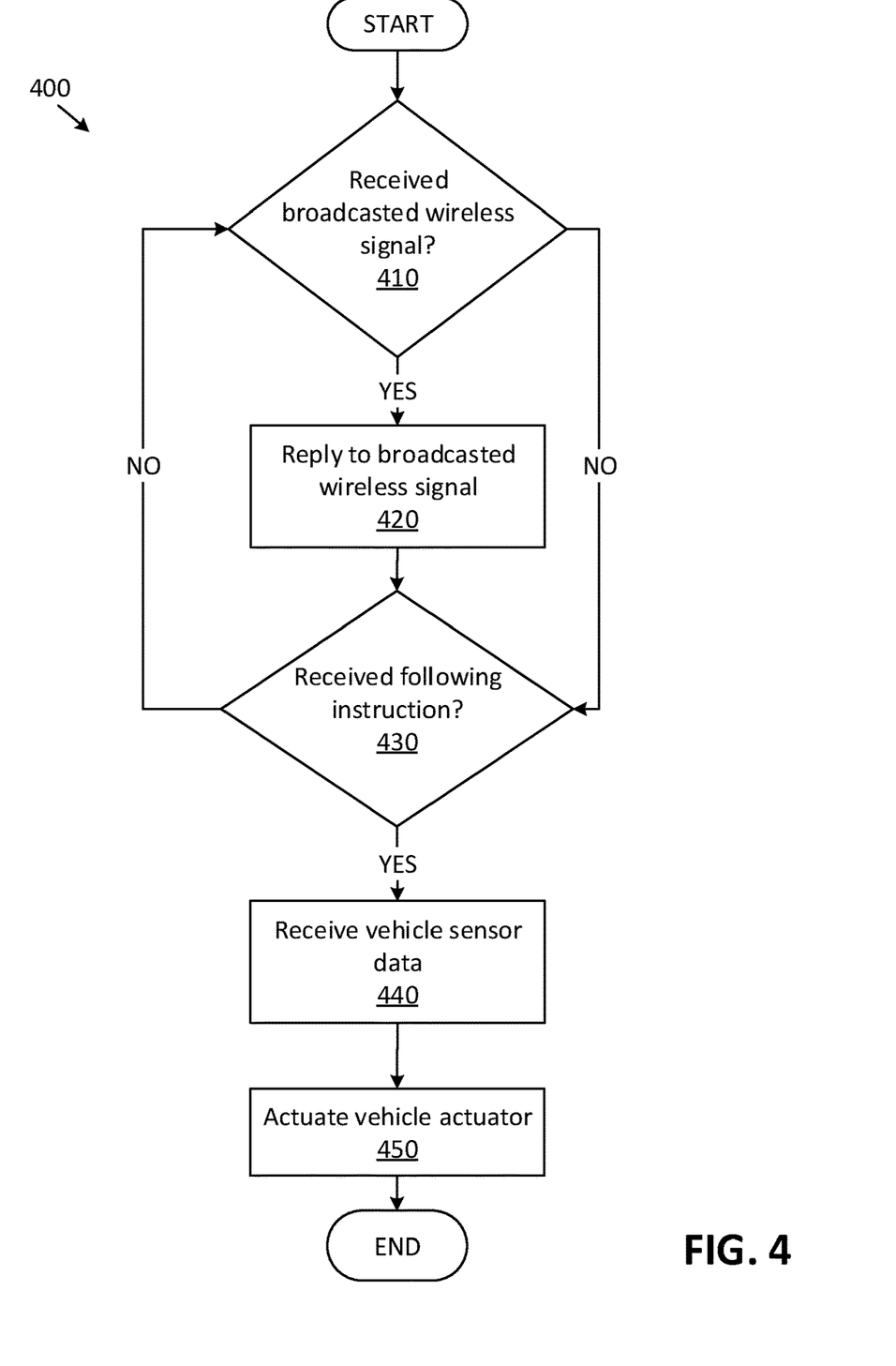
FIG. 4 is a flowchart of an exemplary process for controlling a vehicle operation.

FIG. 4 is a flowchart of an exemplary process 400 for controlling vehicle 110 operation. For example, the vehicle(s) 110 computer 210 may be programmed to execute blocks of the process 400.

The process 400 begins in a decision block 410, in which the computer 210 determines whether a broadcasted wireless signal is received from the transceiver 140A, 140B. For example, as shown in FIG. 2-3, the vehicles 110A, 110B, 110C may receive the broadcasted wireless signal from the transceiver 140A. If the computer 210 determines that the broadcasted wireless signal is received from the transceiver 140A, then the process 400 proceeds to a block 420; otherwise the process 400 proceeds to a decision block 430.

In the block 420, the computer 210 replies to the received broadcasted wireless signal. The computer 210 may be programmed to transmit a response including an identifier of the respective vehicle 110.

In the decision block 430, the computer 210 determines whether a following instruction, i.e., an instruction to follow a lead vehicle 110 at a specified distance, speed, and/or acceleration, is received, e.g., from the controller 130. In one example, the computer 210 may receive the following instruction from the transceivers 140A, 140B. Additionally or alternatively, the computer 210 may be programmed to receive the instruction via the wireless communication network 120 such as LTE, etc. The received instruction may include an identifier of the respective vehicle 110, and the computer 210 may be programmed to determine that the received following instruction is directed to the vehicle 110 based on the included identifier. The following instruction may include an acceleration instruction, following distance to next vehicle 110 in front of the respective vehicle 110 in a same lane, etc. If the computer 210 determines that the following instruction for the vehicle 110 is received, then the process 400 proceeds to a block 440; otherwise the process 400 returns to the decision block 410.

In the block 440, the computer 210 receives vehicle 110 sensor 230 data. For example, the computer 210 may be programmed to receive object data from camera sensor 230, radar sensor 230, etc.

Next, in a block 450, the computer 210 actuates vehicle 110 actuator(s) 220. The computer 210 may be programmed to actuate vehicle 110 actuators 220 to accelerate, brake, maintain the distance from a next vehicle 110 in front of the respective vehicle 110 in a same lane 270, etc. The computer 210 may be programmed to actuate the vehicle 110 actuators 220 based on the received instruction from the controller 130, the vehicle 110 sensor 230 data, etc. For example, the computer 210 may be programmed to actuate the vehicle 110 propulsion actuator 220 to accelerate the vehicle 110 based on the received instruction. Additionally or alternatively, the computer 210 may be programmed to actuate vehicle 110 actuators 220 to accelerate or brake based on a received instruction including a following distance, e.g., 5 meters.

Following the block 450, the process 400 ends, or alternatively returns to the block 410

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising:
   a first antenna mounted at an intersection directed to a first lane;
   a second antenna mounted at the intersection directed to a second lane;
   a computer that includes a processor and a memory, the memory storing instructions executable by the processor, the instructions including instructions such that the computer is programmed to:
      designate, from a plurality of vehicles at an intersection, a first vehicle as a lead vehicle;
      actuate a second vehicle to follow the first vehicle; and
      after determining that the lead vehicle has entered the intersection, designate the second vehicle as the lead vehicle;
      designate the first vehicle as a first lead vehicle for the first lane and a third vehicle as a second lead vehicle for the second lane based on wireless signals received via the first and the second antennas;
      determine a first distance between the intersection and a front transceiver of each of the plurality of vehicles;
      determine a second distance between the intersection and a rear transceiver of each respective vehicle of the plurality of vehicles; and
      determine a travel direction of each respective vehicle of the plurality of vehicles based on the determined first and second distances.

2. The system of claim 1, wherein the computer is further programmed to actuate a fourth vehicle to follow the second vehicle after the second vehicle has been designated as the first lead vehicle in place of the first vehicle.

3. The system of claim 1, wherein the computer is further programmed to identify the plurality of vehicles while the plurality of vehicles are stopped.

4. The system of claim 1, wherein the computer is further programmed to receive an acceleration of the first lead vehicle and instruct the second vehicle to accelerate based on the received acceleration of the first lead vehicle.

5. The system of claim 1, wherein the computer is further programmed to receive a wireless signal from each of the plurality of vehicles, and identifying the plurality of vehicles at the intersection based on received wireless signals.

6. The system of claim 1, wherein the computer is further programmed to determine a travel direction of each of the plurality of vehicles by receiving a first wireless signal from a front transceiver mounted to a front of each of the plurality of vehicles and a second wireless signal from a rear transceiver mounted to a rear of each of the plurality of vehicles.

7. The system of claim 1, wherein the computer is further programmed to determine an order of the plurality of vehicles at each of the first and the second lanes based on the received wireless signals.

8. The system of claim 1, wherein the computer is further programmed to determine respective distances of respective ones of the plurality of vehicles to the intersection based on a time between transmitting a wireless signal from a transceiver at the intersection and receiving, in response to the transmitted signal, the wireless signal from the respective one of the plurality of vehicles.

9. A system, comprising a computer that includes a processor and a memory, the memory storing instructions executable by the processor, the instructions including instructions such that the computer is programmed to:
   designate, from a plurality of vehicles at an intersection, a first vehicle as a lead vehicle;
   actuate a second vehicle to follow the lead vehicle; and
   after determining that the lead vehicle has entered the intersection, designate the second vehicle as the lead vehicle;
   determine a first distance between the intersection and a front transceiver of each of the plurality of vehicles;
   determine a second distance between the intersection and a rear transceiver of each respective vehicle of the plurality of vehicles; and
   determine a travel direction of each respective vehicle of the plurality of vehicles based on the determined first and second distances.

10. The system of claim 9, wherein the computer is further programmed to actuate a third vehicle to follow the second vehicle after the second vehicle has been designated as the lead vehicle.

11. The system of claim 9, wherein the computer is further programmed to identify the plurality of vehicles while the plurality of vehicles are stopped.

12. The system of claim 9, wherein the computer is further programmed to receive an acceleration of the first vehicle designated as the lead vehicle and instruct the second vehicle to accelerate based on the received acceleration of the first vehicle.

13. The system of claim 9, wherein the computer is further programmed to receive a wireless signal from each of the plurality of vehicles, and identifying the plurality of vehicles at the intersection based on received wireless signals.

14. The system of claim 9, wherein the computer is further programmed to determine a travel direction of each of the vehicles by receiving a first wireless signal from a front transceiver mounted to a front of each of the plurality of vehicles and a second wireless signal from a rear transceiver mounted to a rear of each of the plurality of vehicles.

15. The system of claim 9, wherein the computer is further programmed to designate the first vehicle as a first lead vehicle for the first lane and a third vehicle as a second lead vehicle for the second lane based on wireless signals received via the first and the second antennas.

16. The system of claim 9, wherein the computer is further programmed to determine an order of the plurality of vehicles at each of the first and the second lanes based on the received wireless signals.

17. The system of claim 9, wherein the computer is further programmed to determine respective distances of each of the plurality of vehicles to the intersection based on a time between transmitting a wireless signal from a transceiver at the intersection and receiving, in response to the transmitted signal, the wireless signal from the respective vehicle.

* * * * *